United States Patent
Ko et al.

(10) Patent No.: US 11,569,493 B2
(45) Date of Patent: Jan. 31, 2023

(54) POSITIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Takashi Ko, Hyogo (JP); Yasunori Baba, Hyogo (JP); Katsunori Yanagida, Hyogo (JP); Nobuhiro Hirano, Osaka (JP); Fumiharu Niina, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 327 days.

(21) Appl. No.: 16/631,049

(22) PCT Filed: Sep. 28, 2018

(86) PCT No.: PCT/JP2018/036210
§ 371 (c)(1),
(2) Date: Jan. 14, 2020

(87) PCT Pub. No.: WO2019/087631
PCT Pub. Date: May 9, 2019

(65) Prior Publication Data
US 2020/0152966 A1    May 14, 2020

(30) Foreign Application Priority Data

Oct. 31, 2017    (JP) .............................. JP2017-211021

(51) Int. Cl.
*H01M 4/58*    (2010.01)
*H01M 4/136*    (2010.01)
(Continued)

(52) U.S. Cl.
CPC ........... *H01M 4/136* (2013.01); *H01M 4/131* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS 5,487,960 A * 1/1996 Tanaka .................... H01M 4/36
429/223
5,962,167 A    10/1999 Nakai et al.
(Continued)

FOREIGN PATENT DOCUMENTS

CN    105470451 A    4/2016
EP    687025 A1    12/1995
(Continued)

OTHER PUBLICATIONS

International Search Report dated Jan. 8, 2019, issued in counterpart Application No. PCT/JP2018/036210 (2 pages).
(Continued)

*Primary Examiner* — Yoshitoshi Takeuchi
(74) *Attorney, Agent, or Firm* — WHDA, LLP (57) ABSTRACT

A positive electrode including a positive electrode current collector, an intermediate layer disposed on the positive electrode current collector and including a conductive agent and inorganic particles, and a positive electrode mixture layer disposed on the intermediate layer and including a positive electrode active material and a hydrogen phosphate salt represented by the general formula MaHbPO4 (wherein a satisfies 1≤a≤2, b satisfies 1≤b≤2, and M includes at least one element selected from alkali metals and alkaline earth metals), the positive electrode satisfying 0.5≤X≤3.0,
(Continued)

$1.0 \leq Y \leq 7.0$, and $0.07 \leq X/Y \leq 3.0$ wherein X is the mass ratio (mass %) of the hydrogen phosphate salt relative to the total mass of the positive electrode active material and Y is the mass ratio (mass %) of the conductive agent relative to the total mass of the intermediate layer.

4 Claims, 2 Drawing Sheets

(51) Int. Cl.
    *H01M 4/131*      (2010.01)
    *H01M 4/505*      (2010.01)
    *H01M 4/525*      (2010.01)
    *H01M 4/02*      (2006.01)

(52) U.S. Cl.
    CPC .... *H01M 4/5825* (2013.01); *H01M 2004/027* (2013.01); *H01M 2004/028* (2013.01)

(56) References Cited

U.S. PATENT DOCUMENTS

2007/0243468 A1* 10/2007 Ryu .................. H01M 10/052
                                                                         429/231.95

2011/0117432 A1    5/2011   Kay
2013/0089781 A1*   4/2013   Miyazaki ............... H01G 11/30
                                                                          429/211
2016/0093922 A1*   3/2016   Endo ................. H01M 10/4235
                                                                          429/233

FOREIGN PATENT DOCUMENTS

| | | |
|---|---|---|
| JP | 7-307150 A | 11/1995 |
| JP | 10-154532 A | 6/1998 |
| JP | 2011-528483 A | 11/2011 |
| JP | 2016-72221 A | 5/2016 |
| WO | 2007/049871 A1 | 5/2007 |
| WO | 2012/005301 A1 | 1/2012 |

OTHER PUBLICATIONS

The Extended European Search Report dated Jan. 18, 2021, issued in counterpart to EP Application No. 18873526.0. (8 pages).
English Translation of Chinese Search Report dated Jun. 6, 2022, issued in counterpart CN application No. 201880047664.X. (3 pages).

* cited by examiner

POSITIVE ELECTRODE FOR NONAQUEOUS ELECTROLYTE SECONDARY BATTERIES, AND NONAQUEOUS ELECTROLYTE SECONDARY BATTERY

TECHNICAL FIELD

The present invention relates to techniques associated with positive electrodes for nonaqueous electrolyte secondary batteries, and with nonaqueous electrolyte secondary batteries.

BACKGROUND ART

Nonaqueous electrolyte secondary batteries which include a positive electrode, a negative electrode and a nonaqueous electrolyte, and are charged and discharged by the migration of lithium ions between the positive and negative electrodes have a high output and a high energy density. This type of secondary batteries has recently gained widespread use.

For example, PTL 1 discloses a nonaqueous electrolyte secondary battery that includes a positive electrode which has a positive electrode mixture layer, a positive electrode current collector, and an intermediate layer containing inorganic particles and disposed between the positive electrode mixture layer and the positive electrode current collector. PTL 1 suggests that the use of this positive electrode reduces the amount of heat generated in the event of an internal short-circuit in the nonaqueous electrolyte secondary battery.

For example, PTL 2 discloses a nonaqueous electrolyte secondary battery which includes a positive electrode containing $Li_3PO_4$ and a positive electrode active material. It is suggested therein that the use of this positive electrode enhances the safety in the event of overcharging of the nonaqueous electrolyte secondary battery.

CITATION LIST

Patent Literature

PTL 1: Japanese Published Unexamined Patent Application No. 2016-72221
PTL 2: Japanese Published Unexamined Patent Application No. 10-154532

SUMMARY OF INVENTION

Unfortunately, there is still room for improvements in the techniques for reducing the amount of heat generated in the event of internal short-circuits in batteries.

Objects of the present disclosure are therefore to provide a positive electrode for nonaqueous electrolyte secondary batteries that can allow a battery to generate a reduced amount of heat in the event of an internal short-circuit, and to provide a nonaqueous electrolyte secondary battery including the positive electrode.

A positive electrode for nonaqueous electrolyte secondary batteries according to one aspect of the present disclosure includes a positive electrode current collector, an intermediate layer disposed on the positive electrode current collector and including a conductive agent and inorganic particles, and a positive electrode mixture layer disposed on the intermediate layer and including a positive electrode active material and a hydrogen phosphate salt represented by the general formula $M_aH_bPO_4$ (wherein a satisfies $1 \le a \le 2$, b satisfies $1 \le b \le 2$, and M includes at least one element selected from alkali metals and alkaline earth metals), the positive electrode satisfying $0.5 \le X \le 3.0$, $1.0 \le Y \le 7.0$, and $0.07 \le X/Y \le 3.0$ wherein X is the mass ratio (mass %) of the hydrogen phosphate salt relative to the total mass of the positive electrode active material and Y is the mass ratio (mass %) of the conductive agent relative to the total mass of the intermediate layer.

A nonaqueous electrolyte secondary battery according to one aspect of the present disclosure includes the above positive electrode for nonaqueous electrolyte secondary batteries.

According to the present disclosure, the amount of heat generated in the event of internal short-circuits of batteries can be reduced.

DESCRIPTION OF EMBODIMENTS

A positive electrode for nonaqueous electrolyte secondary batteries according to one aspect of the present disclosure includes a positive electrode current collector, an intermediate layer disposed on the positive electrode current collector and including a conductive agent and inorganic particles, and a positive electrode mixture layer disposed on the intermediate layer and including a positive electrode active material and a hydrogen phosphate salt represented by the general formula $M_aH_bPO_4$ (wherein a satisfies $1 \le a \le 2$, b satisfies $1 \le b \le 2$, and M includes at least one element selected from alkali metals and alkaline earth metals), the positive electrode satisfying $0.5 \le X \le 3.0$, $1.0 \le Y \le 7.0$, and $0.07 \le X/Y \le 3.0$ wherein X is the mass ratio (mass %) of the hydrogen phosphate salt relative to the total mass of the positive electrode active material and Y is the mass ratio (mass %) of the conductive agent relative to the total mass of the intermediate layer. This positive electrode for nonaqueous electrolyte secondary batteries according to one aspect of the present disclosure can allow a nonaqueous electrolyte secondary battery to generate a reduced amount of heat in the event of an internal short-circuit. The mechanisms of this effect are not fully understood, but are probably as described below.

In general, a nonaqueous electrolyte secondary battery that is internally short-circuited generates heat by the flow of short-circuit current. Further, on the positive electrode side, the heat generated by the internal short-circuiting of the battery induces a reaction (an exothermic reaction) between a positive electrode current collector and oxygen released from a positive electrode active material in a positive electrode mixture layer. Consequently, the battery is caused to generate more heat. In the nonaqueous electrolyte secondary battery according to one aspect of the present disclosure, the hydrogen phosphate salt in the positive electrode mixture layer is probably decomposed by the short-circuit current and heat generated by the internal short-circuiting of the battery, and will enter into voids present around the conductive agent in the intermediate layer. Further, the decomposed hydrogen phosphate salt will be poly-condensed in the voids and will close the voids around the conductive agent. Here, oxygen released from the positive electrode active material probably reaches the positive electrode current collector mainly through the voids present around the conductive agent in the intermediate layer. Because the voids are blocked, oxygen will be prevented from travelling to the current collector and consequently the exothermic reaction on the positive electrode side will be suppressed. In the presence of an internal short-circuit, the intermediate layer contains the polycondensation product of the hydrogen phosphate salt in addition to the inorganic particles, and thus will function as a high resistance component and will reduce the short-circuit current that flows in the internal short-circuit. Probably due to the mechanisms described above, the battery attains a reduction in the amount of heat generated in the event of an internal short-circuit.

In the positive electrode for nonaqueous electrolyte secondary batteries according to one aspect of the present disclosure, the content of the hydrogen phosphate salt contained in the positive electrode mixture layer and the content of the conductive agent contained in the intermediate layer satisfy $0.5 \leq X \leq 3.0$, $1.0 \leq Y \leq 7.0$, and $0.07 \leq X/Y \leq 3.0$ wherein X is the mass ratio (mass %) of the hydrogen phosphate salt relative to the total mass of the positive electrode active material and Y is the mass ratio (mass %) of the conductive agent relative to the total mass of the intermediate layer. By virtue of the satisfaction of these relationships, the positive electrode generates a reduced amount of heat in the event of an internal short-circuit of the battery as described above, and can also fulfill its original function in normal times to allow the charging and discharging reactions to take place properly in the absence of an internal short-circuit.

Hereinbelow, an example embodiment will be described in detail. The drawings referred to in the description of the embodiment are only illustrative, and the configurations such as the size proportions of the constituent elements illustrated in the drawings may differ from those in the actual batteries.

Figure 1:
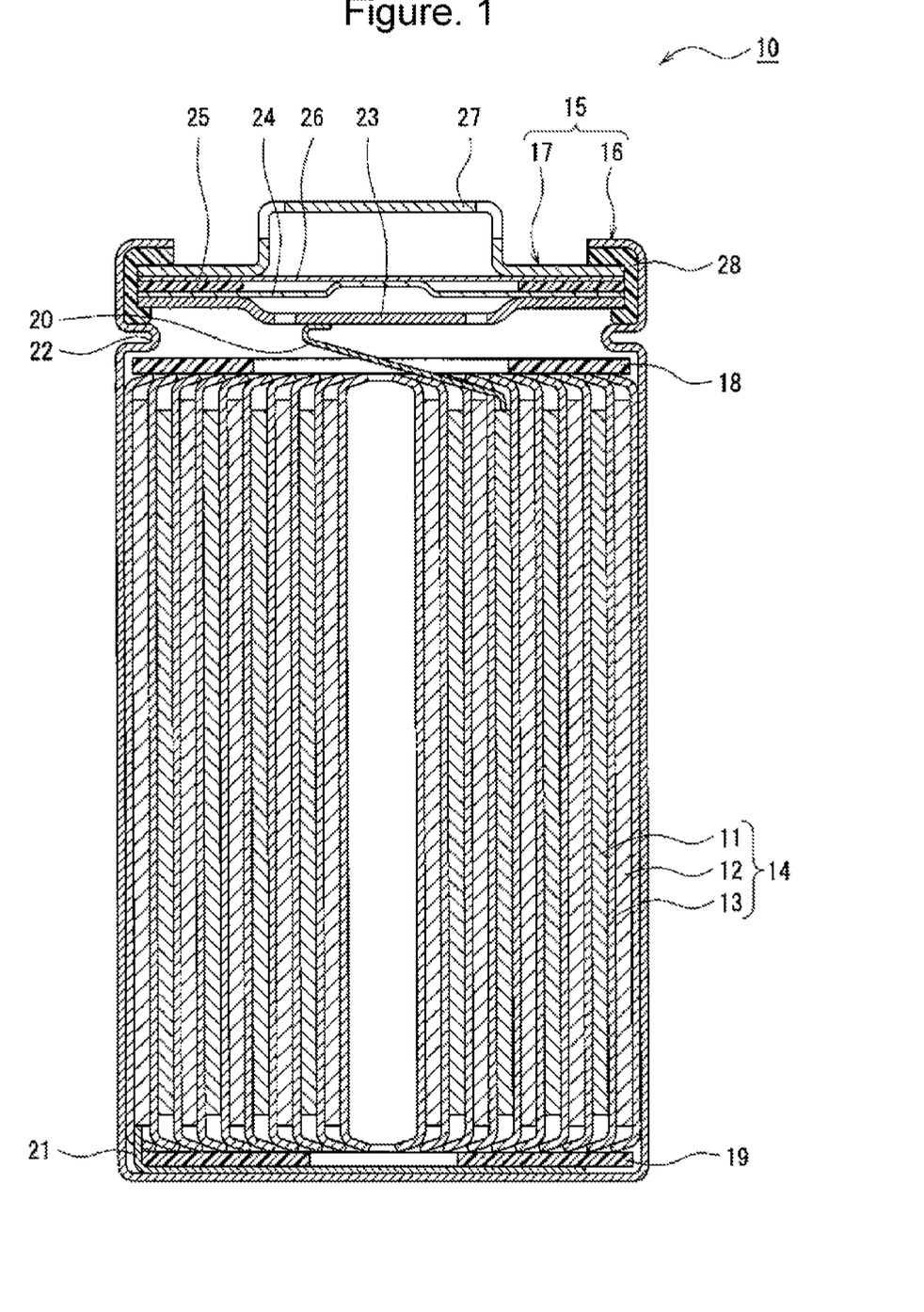
FIG. 1 is a sectional view of a nonaqueous electrolyte secondary battery according to an example embodiment.

FIG. 1 is a sectional view of a nonaqueous electrolyte secondary battery according to an example embodiment. The nonaqueous electrolyte secondary battery 10 illustrated in FIG. 1 includes a wound electrode assembly 14 formed by coiling a positive electrode 11 and a negative electrode 12 via a separator 13, a nonaqueous electrolyte, insulating plates 18, 19 disposed on and under the electrode assembly 14, respectively, and a battery case 15 accommodating the above members. The battery case 15 is composed of a bottomed cylindrical case body 16, and a seal body 17 which seals the opening of the case body 16. Incidentally, the wound electrode assembly 14 may be replaced by other form of an electrode assembly such as a stacked electrode assembly in which positive electrodes and negative electrodes are stacked alternately on top of one another via separators. Examples of the battery cases 15 include metallic cases such as cylindrical cases, prismatic cases, coin-shaped cases and button-shaped cases, and resin cases (laminate batteries) formed by laminating resin sheets.

For example, the case body 16 is a bottomed cylindrical metallic container. A gasket 28 is disposed between the case body 16 and the seal body 17 to ensure tightness inside the battery. The case body 16 has an overhang 22 which is defined by, for example, a lateral portion projecting toward the inside and which supports the seal body 17. The overhang 22 is preferably an annular portion which extends along the circumference of the case body 16, and supports the seal body 17 on the upper side thereof.

The seal body 17 has a structure in which a filter 23, a lower valve 24, an insulating member 25, an upper valve 26 and a cap 27 are stacked in this order from the side adjacent to the electrode assembly 14. For example, the members constituting the seal body 17 have a disk shape or a ring shape, and the members except the insulating member 25 are electrically connected to one another. The lower valve 24 and the upper valve 26 are connected to each other in the respective central portions, and the insulating member 25 is interposed between peripheral portions of the valves. In the event that the inner pressure is increased by heat generation due to an abnormality such as an internal short-circuit, for example, the lower valve 24 is deformed so as to push the upper valve 26 toward the cap 27 and ruptures to interrupt the current path between the lower valve 24 and the upper valve 26. If the inner pressure is further raised, the upper valve 26 is ruptured and allows the gas to be discharged through the opening in the cap 27.

In the nonaqueous electrolyte secondary battery 10 illustrated in FIG. 1, a positive electrode lead 20 attached to the positive electrode 11 extends toward the seal body 17 through a through-hole in the insulating plate 18, and a negative electrode lead 21 attached to the negative electrode 12 extends along the outside of the insulating plate 19 to the bottom of the case body 16. The positive electrode lead 20 is connected by welding or the like to the lower side of the filter 23 that is a bottom plate of the seal body 17. Thus, the cap 27 that is a top plate of the seal body 17 and is electrically connected to the filter 23 serves as a positive electrode terminal. The negative electrode lead 21 is connected by welding or the like to the inner side of the bottom of the case body 16, thus allowing the case body 16 to serve as a negative electrode terminal.

Hereinbelow, the positive electrode, the negative electrode, the separator and the nonaqueous electrolyte will be described in detail.

[Positive Electrodes]

Figure 2:
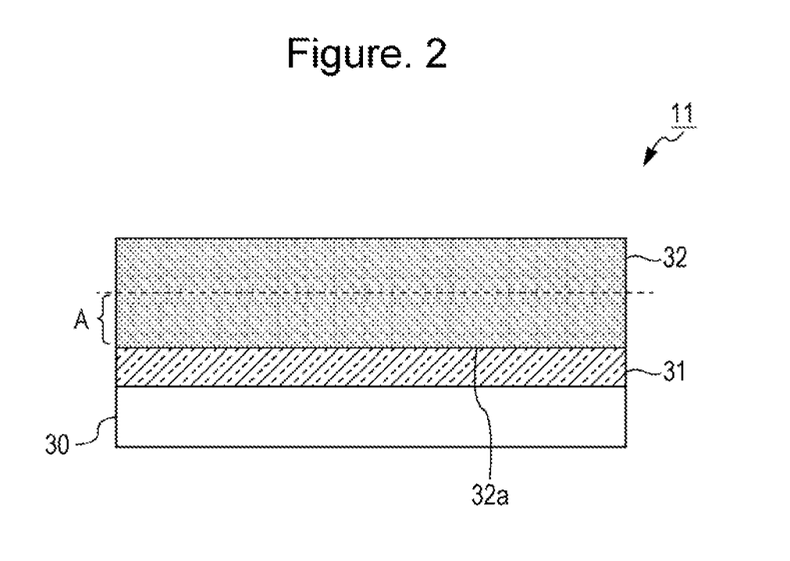
FIG. 2 is a sectional view of a positive electrode according to an example embodiment.

FIG. 2 is a sectional view of a positive electrode according to an example embodiment. The positive electrode 11 includes a positive electrode current collector 30, an intermediate layer 31 disposed on the positive electrode current collector 30, and a positive electrode mixture layer 32 disposed on the intermediate layer 31.

The positive electrode current collector 30 may be, for example, a foil of a metal that is stable at the potentials of the positive electrode 11, or a film having such a metal as a skin layer. Examples of the metals stable at the potentials of the positive electrode 11 include aluminum metals such as aluminum and aluminum alloys. For example, the positive electrode current collector 30 has a thickness of about 10 μm to 100 μm.

The positive electrode mixture layer 32 includes a positive electrode active material and a hydrogen phosphate salt. For reasons such as that the positive electrode active material particles can be bonded together to ensure the mechanical strength of the positive electrode mixture layer 32 and that the adhesion between the positive electrode mixture layer 32 and the intermediate layer 31 can be increased, the positive electrode mixture layer 32 preferably includes a binder. Further, the positive electrode mixture layer 32 preferably includes a conductive agent for reasons such as that the conductivity of the layer can be enhanced.

Examples of the positive electrode active materials include lithium transition metal oxides containing transition metal elements such as Co, Mn and Ni. For example, the positive electrode active material preferably comprises a lithium transition metal oxide represented by the general formula $Li_{1+x}Ni_aM_{1-a}O_{2+b}$ (wherein x, a and b satisfy $-0.2 < x \leq 0.2$, $0.5 \leq a \leq 1$, and $-0.1 \leq b \leq 0.1$, and M includes at least one element selected from Co, Mn and Al). As shown in the above general formula, this lithium transition metal oxide contains 50 mol % or more Ni. Such a Ni-excess lithium transition metal oxide allows a nonaqueous electrolyte secondary battery to attain a higher capacity, but releases a large amount of oxygen when heated during an internal short-circuit and thus gives rise to a risk that the battery will generate an increased amount of heat at the time of internal short-circuiting. However, according to the present embodiment, the amount of heat generated from an internally short-circuited battery can be reduced by the mechanisms described hereinabove such as the polycondensation of the decomposed hydrogen phosphate salt to close the voids present around the conductive agent in the intermediate layer, and the consequent difficulty encountered by released oxygen traveling from the positive electrode mixture layer to the positive electrode current collector. Incidentally, M in the lithium transition metal oxide represented by the above general formula includes at least one element selected from Co, Mn and Al and may further include other metal elements such as, for example, Na, Mg, Sc, Y, Fe, Cu, Zn, Cr, Pb, Sb and B.

The average particle size of the positive electrode active material is not particularly limited, but is preferably, for example, not less than 2 μm and not more than 20 μm. If the average particle size is less than 2 μm or is more than 20 μm, the packing density of the positive electrode mixture layer 32 is low as compared to when the above range is satisfied, and consequently the nonaqueous electrolyte secondary battery may incur a decrease in capacity. The average particle size is the volume average particle size measured by a laser diffraction method at which the cumulative volume curve reaches 50% median of the particle size distribution. The average particle size may be measured with, for example, a laser diffraction scattering grain size distribution analyzer (manufactured by HORIBA, Ltd.).

The hydrogen phosphate salt comprises a hydrogen phosphate salt represented by the general formula $M_aH_bPO_4$ (wherein a satisfies $1 \leq a \leq 2$, b satisfies $1 \leq b \leq 2$, and M includes at least one element selected from alkali metals and alkaline earth metals). In the present specification, the alkali metals are defined as Group I elements in the periodic table except hydrogen, namely, lithium, sodium, potassium, rubidium cesium and francium. In the present specification, the alkaline earth metals are defined as Group II elements in the periodic table, namely, beryllium, magnesium, calcium, strontium, barium and radium.

Examples of the hydrogen phosphate salts represented by the general formula $M_aH_bPO_4$ (wherein a satisfies $1 \leq a \leq 2$, b satisfies $1 \leq b \leq 2$, and M includes at least one element selected from alkali metals and alkaline earth metals) include $Li_2HPO_4$, $LiH_2PO_4$, $Na_2HPO_4$, $NaH_2PO_4$, $K_2HPO_4$, $KH_2PO_4$, $CaHPO_4$ and $MgHPO_4$. The hydrogen phosphate salts may be used singly, or two or more may be used in combination. From points of view such as decomposition rate, the hydrogen phosphate salt preferably comprises at least one of $Li_2HPO_4$ and $LiH_2PO_4$.

Examples of the conductive agents contained in the positive electrode mixture layer 32 include carbon particles such as carbon black (CB), acetylene black (AB), Ketjen black and graphite. The conductive agents may be used singly, or two or more may be used in combination.

Examples of the binders contained in the positive electrode mixture layer 32 include fluororesins such as polytetrafluoroethylene (PTFE) and polyvinylidene fluoride (PVDF), polyacrylonitriles (PAN), polyimide resins, acrylic resins and polyolefin resins. These resins may be used in combination with, for example, carboxymethylcellulose (CMC) or a salt thereof (such as CMC-Na, CMC-K or CMC-NH$_4$, or a partially neutralized salt), or polyethylene oxide (PEO). The binders may be used singly, or two or more may be used in combination.

The intermediate layer 31 includes inorganic particles and a conductive agent. For reasons such as that the intermediate layer can attain an increased mechanical strength and a higher adhesion with respect to other layers, it is preferable that the intermediate layer 31 contain a binder.

Examples of the conductive agents contained in the intermediate layer 31 include carbon particles such as carbon black (CB), acetylene black (AB), Ketjen black and graphite. The conductive agents may be used singly, or two or more may be used in combination.

The primary particle size of the conductive agent is not particularly limited. From points of view such as the dispersibility in the intermediate layer 31, for example, the primary particle size is preferably not less than 10 nm and not more than 100 nm, or preferably not less than 20 nm and not more than 80 nm.

To ensure that, for example, the intermediate layer 31 will function as a resistance component in the event of an internal short-circuit, the inorganic particles preferably have a higher resistance than, for example, the positive electrode active material. Specifically, the inorganic particles preferably have a resistivity of not less than $10^{12}$ Ωm. Examples of the inorganic particles include metal oxide particles, metal nitride particles, metal fluoride particles and insulating magnetic particles. Examples of the metal oxide particles include aluminum oxide, titanium oxide, zirconium oxide, silicon oxide, manganese oxide, magnesium oxide and nickel oxide. Examples of the metal nitride particles include boron nitride, aluminum nitride, magnesium nitride and silicon nitride. Examples of the metal fluoride particles include aluminum fluoride, lithium fluoride, sodium fluoride, magnesium fluoride, calcium fluoride, barium fluoride, aluminum hydroxide and boehmite. Examples of the insulating magnetic particles include Ni—Cu—Zn ferrite. From points of view such as insulating properties, high melting point and lower oxidizing power than the positive electrode active material, the inorganic particles preferably comprise at least one of aluminum oxide, titanium oxide, silicon oxide and manganese oxide, and more preferably comprise at least aluminum oxide. The use of inorganic particles having lower oxidizing power than the positive electrode active material leads to a decrease in the amount of oxygen released from the positive electrode active material during internal short-circuiting and thus may sometimes attain a further reduction in the amount of heat generated from the battery.

The average particle size of the inorganic particles is not particularly limited. From points of view such as the dispersibility in the intermediate layer 31, for example, the average particle size is preferably not less than 0.1 μm and not more than 5.0 μm, and more preferably not less than 0.5 μm and not more than 2.0 μm.

Examples of the binders contained in the intermediate layer 31 include fluororesins such as polytetrafluoroethylene (PTFE) and polyvinylidene fluoride (PVDF), polyacrylonitriles (PAN), polyimide resins, acrylic resins and polyolefin resins. These resins may be used in combination with, for example, carboxymethylcellulose (CMC) or a salt thereof (such as CMC-Na, CMC-K or CMC-NH$_4$, or a partially neutralized salt), or polyethylene oxide (PEO). The binders may be used singly, or two or more may be used in combination.

Hereinbelow, the contents of the components contained in the intermediate layer 31 and the positive electrode mixture layer 32 will be described.

The content of the hydrogen phosphate salt contained in the positive electrode mixture layer 32 and the content of the conductive agent contained in the intermediate layer 31 satisfy $0.5 \leq X \leq 3.0$, $1.0 \leq Y \leq 7.0$, and $0.07 \leq X/Y \leq 3.0$ wherein X is the mass ratio (mass %) of the hydrogen phosphate salt relative to the total mass of the positive electrode active material and Y is the mass ratio (mass %) of the conductive agent relative to the total mass of the intermediate layer 31. As mentioned earlier, the satisfaction of these relationships ensures that the positive electrode generates a reduced amount of heat in the event of an internal short-circuit of the battery as described hereinabove, and can also fulfill its original function in normal times to allow the charging and discharging reactions to take place properly in the absence of an internal short-circuit. If X/Y is less than 0.07, for example, the hydrogen phosphate salt fails to close sufficiently the voids present around the conductive agent in the intermediate layer 31, making it difficult to reduce the amount of heat generated by the battery in the event of internal short-circuiting. If X/Y exceeds 3, for example, the conductivity of the positive electrode mixture layer 32 or the intermediate layer 31 is lowered and the positive electrode significantly deteriorates its original function to allow the charging and discharging reactions to take place properly in normal times. How much voids will be formed around the conductive agent probably mainly depends on the mass ratio (mass %) of the conductive agent in the intermediate layer.

For the reason that the amount of heat generated in the event of an internal short-circuit of the battery can be further reduced while ensuring that the positive electrode will fulfill its original function to allow the charging and discharging reactions to take place properly in normal times, it is preferable that $0.1 \leq X/Y \leq 3.0$. X and Y are preferably $1.0 \leq X \leq 3.0$ and $2.0 \leq Y \leq 5.0$. Further, it is more preferable that $0.1 \leq X/Y \leq 3.0$, $1.0 \leq X \leq 3.0$ and $2.0 \leq Y \leq 5.0$.

The hydrogen phosphate salt in the positive electrode mixture layer 32 is preferably localized on the intermediate layer 31 side rather than being uniformly dispersed in the positive electrode mixture layer 32. Specifically, it is preferable that, in the positive electrode mixture layer 32 illustrated in FIG. 2, the content of the hydrogen phosphate salt present in region A extending from the surface 32a adjacent to the intermediate layer to ½ thickness of the positive electrode mixture layer 32 be more than 50 mass %, more preferably not less than 55 mass %, of the total mass of the hydrogen phosphate salt in the positive electrode mixture layer 32. Such distribution ensures that the hydrogen phosphate salt in the positive electrode mixture layer 32 will close the voids in the intermediate layer 31 more efficiently in the event of an internal short-circuit, and the heat generation from the internally short-circuited battery may be sufficiently reduced at times.

For example, the distribution of the hydrogen phosphate salt across the thickness of the positive electrode mixture layer 32 may be identified by general scanning electron microscope (SEM)-energy dispersive X-ray spectroscopy (EDX). Specifically, the electrode assembly is removed from the battery can, and the positive electrode plate alone is recovered. Next, the positive electrode plate is cleaned with dimethyl carbonate solvent to remove components such as the electrolyte salt. The positive electrode plate is then processed with a cross section polisher or the like to expose a cross section, and the positive electrode mixture layer is observed by SEM with respect to a region extending from the top surface to ½ thickness and a region extending from the surface adjacent to the intermediate layer to ½ thickness. The SEM images thus obtained are analyzed by EDX (for example, phosphorus (P) element specific to lithium phosphate is mapped) and are compared to each other (for example, the counts per second (CPS) in the same fields of view are compared). The amounts of the hydrogen phosphate salt present in the respective regions can be thus grasped.

The content of the positive electrode active material in the positive electrode mixture layer 32 may be selected appropriately in accordance with factors such as the mass ratio X (mass %) of the hydrogen phosphate salt, and is, for example, preferably not less than 80 mass % and not more than 99 mass %, and more preferably not less than 90 mass % and not more than 98 mass % relative to the total mass of the positive electrode mixture layer 32.

The content of the inorganic particles in the intermediate layer 31 may be selected appropriately in accordance with factors such as the mass ratio Y (mass %) of the conductive agent, and is, for example, preferably not less than 80 mass % and not more than 99 mass %, and more preferably not less than 90 mass % and not more than 98 mass % relative to the total mass of the intermediate layer 31.

The intermediate layer 31 contains voids. The void content is not particularly limited, but is preferably, for example, not less than 50% and not more than 80%.

The thickness of the positive electrode mixture layer 32 is not particularly limited, but is preferably in the range of, for example, 10 μm to 300 μm.

The thickness of the intermediate layer 31 is preferably in the range of, for example, 1 μm to 20 μm. If the thickness of the intermediate layer 31 is more than 20 μm, the intermediate layer 31 exhibits a high resistance as compared to when the thickness of the intermediate layer 31 satisfies the above range, and consequently battery characteristics may be lowered. If the thickness of the intermediate layer 31 is less than 1 μm, the positive electrode current collector 30 and the positive electrode mixture layer 32 are so narrowly separated from each other that the amount of heat generated in the event of an internal short-circuit of the battery may not be effectively reduced as compared to when the thickness of the intermediate layer 31 satisfies the above range.

An example method for fabricating the positive electrode 11 will be described. First, an intermediate layer slurry including components such as inorganic particles and a conductive agent is applied onto a positive electrode current collector 30, and the wet film is dried to form an intermediate layer 31. Next, a positive electrode mixture slurry including components such as a positive electrode active material and a hydrogen phosphate salt is applied onto the intermediate layer 31, and the wet film is dried to form a positive electrode mixture layer 32. The positive electrode mixture layer 32 is then rolled. A positive electrode 11 may be thus obtained.

[Negative Electrodes]

For example, the negative electrode 12 includes a negative electrode current collector such as a metal foil, and a negative electrode mixture layer disposed on the negative electrode current collector. The negative electrode current collector may be, for example, a foil of a metal that is stable at the negative electrode potentials, such as copper, or a film having such a metal as a skin layer. For example, the negative electrode mixture layer includes components such as a negative electrode active material, a binder and a thickener.

For example, the negative electrode 12 may be obtained by applying a negative electrode mixture slurry including components such as a negative electrode active material, a thickener and a binder onto the negative electrode current collector, drying the wet film to form a negative electrode mixture layer on the negative electrode current collector, and rolling the negative electrode mixture layer. The negative electrode mixture layer may be formed on both sides of the negative electrode current collector.

The negative electrode active material is not particularly limited as long as it can store and release lithium ions. Examples thereof include metallic lithium, lithium alloys such as lithium-aluminum alloys, lithium-lead alloys, lithium-silicon alloys and lithium-tin alloys, carbon materials such as graphite, coke and calcined organic materials, and metal oxides such as $SnO_2$, SnO and $TiO_2$. The materials may be used singly, or two or more may be used in combination.

Examples of the binders contained in the negative electrode mixture layers include fluororesins, PAN, polyimide resins, acrylic resins and polyolefin resins, similarly to the case of the positive electrodes. When the negative electrode mixture slurry is prepared using an aqueous solvent, for example, styrene-butadiene rubber (SBR), CMC or a salt thereof, polyacrylic acid (PAA) or a salt thereof (such as PAA-Na or PAA-K, or a partially neutralized salt), or polyvinyl alcohol (PVA) may be preferably used.

[Separators]

For example, the separator 13 may be a porous sheet having ion permeability and insulating properties. Specific examples of the porous sheets include microporous thin films, woven fabrics and nonwoven fabrics. Some preferred separator materials are olefin resins such as polyethylene and polypropylene, and celluloses. The separator 13 may be a stack having a cellulose fiber layer and a thermoplastic resin fiber layer such as of olefin resin. The separator may be a multilayer separator including a polyethylene layer and a polypropylene layer, and the surface of the separator may be coated with a material such as an aramid resin or a ceramic.

[Nonaqueous Electrolytes]

The nonaqueous electrolyte includes a nonaqueous solvent and a solute (an electrolyte salt) dissolved in the nonaqueous solvent. Examples of the nonaqueous solvents include esters, ethers, nitriles, amides such as dimethylformamide, isocyanates such as hexamethylenediisocyanate, and mixtures of two or more kinds of these solvents. The nonaqueous solvent may include a halogenated solvent resulting from the substitution of the above solvent with a halogen atom such as fluorine in place of at least part of hydrogen.

Examples of the esters include cyclic carbonate esters such as ethylene carbonate (EC), propylene carbonate (PC) and butylene carbonate, chain carbonate esters such as dimethyl carbonate (DMC), ethyl methyl carbonate (EMC), diethyl carbonate (DEC), methyl propyl carbonate, ethyl propyl carbonate and methyl isopropyl carbonate, cyclic carboxylate esters such as γ-butyrolactone and γ-valerolactone, and chain carboxylate esters such as methyl acetate, ethyl acetate, propyl acetate, methyl propionate (MP) and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether and tetraethylene glycol dimethyl ether.

Examples of the nitriles include acetonitrile, propionitrile, butyronitrile, valeronitrile, n-heptanitrile, succinonitrile, glutaronitrile, adiponitrile, pimelonitrile, 1,2,3-propanetricarbonitrile and 1,3,5-pentanetricarbonitrile.

Examples of the halogenated solvents include fluorinated cyclic carbonate esters such as fluoroethylene carbonate (FEC), fluorinated chain carbonate esters, and fluorinated chain carboxylate esters such as fluoromethyl propionate (FMP).

Examples of the electrolyte salts include $LiBF_4$, $LiClO_4$, $LiPF_6$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, and n is 1 or 2), $LiB_{10}Cl_{10}$, LiCl, LiBr, LiI, chloroborane lithium, lithium lower aliphatic carboxylates, borate salts such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ {l and m are integers of 0 or greater}. A single electrolyte salt, or a mixture of electrolyte salts may be used. For example, the concentration of the electrolyte salt is 0.8 to 1.8 mol per L of the nonaqueous solvent.

EXAMPLES

Hereinbelow, the present disclosure will be further described based on EXAMPLES. However, it should be construed that the scope of the present disclosure is not limited to such EXAMPLES.

Example 1

[Fabrication of Positive Electrode]

Alumina particles (average particle size: 0.7 μm, AKP3000 manufactured by Sumitomo Chemical Co., Ltd.) as inorganic particles, acetylene black (AB manufactured by Denka Company Limited) as a conductive agent, and polyvinylidene fluoride (PVDF) as a binder were mixed together in a mass ratio of 95:3:2. An appropriate amount of N-methyl-2-pyrrolidone (NMP) as a dispersion medium was added to the mixture. The resultant mixture was stirred with use of a mixer (T.K. HIVIS MIX manufactured by Primix) to give an intermediate layer slurry. Next, the slurry was applied to both sides of an aluminum foil having a thickness suited as a positive electrode current collector. The wet films were dried to form intermediate layers.

Next, $LiNi_{0.8}Co_{0.1}Mn_{0.1}O_2$ as a positive electrode active material, acetylene black (AB manufactured by Denka Company Limited) as a conductive agent, polyvinylidene fluoride (PVDF) as a binder, and dilithium hydrogen phosphate were mixed together in a mass ratio of 96:1:1:2. An appropriate amount of N-methyl-2-pyrrolidone (NMP) as a dispersion medium was added to the mixture. The resultant mixture was stirred with use of a mixer (T.K. HIVIS MIX manufactured by Primix) to give a positive electrode mixture slurry. The positive electrode mixture slurry was applied onto the intermediate layers. The wet films were dried and rolled with a roller, thereby forming positive electrode mixture layers. Thus, a positive electrode was fabricated which had the positive electrode current collector, the intermediate layers on both sides of the positive electrode current collector, and the positive electrode mixture layers on the intermediate layers.

[Fabrication of Negative Electrode]

Artificial graphite (average particle size: 10 μm, BET specific surface area: 3 $m^2/g$), carboxymethylcellulose (CMC) and styrene-butadiene rubber (SBR) were mixed together in a mass ratio of 97.5:1:1.5. An appropriate amount of water was added. The resultant mixture was stirred with use of a mixer (T.K. HIVIS MIX manufactured by Primix) to give a negative electrode mixture slurry. Next, the negative electrode mixture slurry was applied to both sides of a copper foil as a negative electrode current collector. The wet films were dried and rolled with a roller. Thus, a negative electrode was fabricated which had negative electrode mixture layers on both sides of the negative electrode current collector.

[Preparation of Nonaqueous Electrolyte]

Ethylene carbonate (EC), methyl ethyl carbonate (MEC) and dimethyl carbonate (DMC) were mixed together in a volume ratio of 30:30:40. $LiPF_6$ was dissolved into the mixed solvent with a concentration of 1.0 mol/L. Further, vinylene carbonate was dissolved into the mixed solvent with a concentration of 1.0 mass % relative to the mixed solvent. A nonaqueous electrolyte was thus prepared.

[Fabrication of Nonaqueous Electrolyte Secondary Battery]

Electrode tabs were attached to the positive electrode and the negative electrode. The electrodes were coiled together via a separator to form a wound electrode assembly. Next, the electrode assembly was placed into an aluminum laminate film and was vacuum dried at 85° C. for 2 hours. Thereafter, the nonaqueous electrolyte was poured, and the film was tightly sealed. A nonaqueous electrolyte secondary battery of EXAMPLE 1 was thus fabricated. The design capacity of the battery was 800 mAh.

Example 2

A positive electrode and a nonaqueous electrolyte secondary battery were fabricated in the same manner as in EXAMPLE 1, except that in the step of preparing an intermediate layer slurry, the alumina particles, the acetylene black and the polyvinylidene fluoride were mixed together in a mass ratio of 97:1:2, and in the step of preparing a positive electrode mixture slurry, $LiNi_{0.8}Co_{0.1}Mn_{0.1}O_2$, the acetylene black, the polyvinylidene fluoride and the dilithium hydrogen phosphate were mixed together in a mass ratio of 95:1:1:3.

Example 3

A positive electrode and a nonaqueous electrolyte secondary battery were fabricated in the same manner as in EXAMPLE 1, except that in the step of preparing an intermediate layer slurry, the alumina particles, the acetylene black and the polyvinylidene fluoride were mixed together in a mass ratio of 91:7:2, and in the step of preparing a positive electrode mixture slurry, $LiNi_{0.8}Co_{0.1}Mn_{0.1}O_2$, the acetylene black, the polyvinylidene fluoride and the dilithium hydrogen phosphate were mixed together in a mass ratio of 97.5:1:1:0.5.

Example 4

A positive electrode and a nonaqueous electrolyte secondary battery were fabricated in the same manner as in EXAMPLE 1, except that in the step of preparing a positive electrode mixture slurry, the dilithium hydrogen phosphate was replaced by lithium dihydrogen phosphate.

Example 5

A positive electrode and a nonaqueous electrolyte secondary battery were fabricated in the same manner as in EXAMPLE 1, except that in the step of preparing a positive electrode mixture slurry, the dilithium hydrogen phosphate was replaced by disodium hydrogen phosphate.

Example 6

A positive electrode and a nonaqueous electrolyte secondary battery were fabricated in the same manner as in EXAMPLE 1, except that in the step of preparing a positive electrode mixture slurry, the dilithium hydrogen phosphate was replaced by dipotassium hydrogen phosphate.

Example 7

A positive electrode and a nonaqueous electrolyte secondary battery were fabricated in the same manner as in EXAMPLE 1, except that in the step of preparing a positive electrode mixture slurry, the dilithium hydrogen phosphate was replaced by magnesium hydrogen phosphate.

Example 8

Two slurries were prepared as positive electrode mixture slurries. One was slurry A which contained $LiNi_{0.8}Co_{0.1}Mn_{0.1}O_2$, acetylene black, polyvinylidene fluoride and dilithium hydrogen phosphate in a mass ratio of 95.5:1:1:2.5, and the other was slurry B which contained $LiNi_{0.8}Co_{0.1}Mn_{0.1}O_2$, acetylene black, polyvinylidene fluoride and dilithium hydrogen phosphate in a mass ratio of 96.5:1:1:1.5. A positive electrode and a nonaqueous electrolyte secondary battery were fabricated in the same manner as in EXAMPLE 1, except that in the step of fabricating a positive electrode, the slurry A was applied onto the intermediate layers, the wet films being then dried, and the slurry B was applied in the same basis weight onto the coatings and was dried, thus fabricating bilaminar positive electrode mixture layers.

Comparative Example 1

A positive electrode and a nonaqueous electrolyte secondary battery were fabricated in the same manner as in EXAMPLE 1, except that in the step of preparing a positive electrode mixture slurry, the dilithium hydrogen phosphate was not used, and $LiNi_{0.8}Co_{0.1}Mn_{0.1}O_2$, the acetylene black and the polyvinylidene fluoride were mixed together in a mass ratio of 98:1:1.

Comparative Example 2

A positive electrode and a nonaqueous electrolyte secondary battery were fabricated in the same manner as in EXAMPLE 1, except that in the step of preparing a positive electrode, positive electrode mixture layers were formed onto the aluminum foil without forming intermediate layers.

Comparative Example 3

A positive electrode and a nonaqueous electrolyte secondary battery were fabricated in the same manner as in EXAMPLE 1, except that in the step of preparing an intermediate layer slurry, the alumina particles, the acetylene black and the polyvinylidene fluoride were mixed together in a mass ratio of 91:7:2, and in the step of preparing a positive electrode mixture slurry, $LiNi_{0.8}Co_{0.1}Mn_{0.1}O_2$, the acetylene black, the polyvinylidene fluoride and the dilithium hydrogen phosphate were mixed together in a mass ratio of 97.6:1:1:0.4.

Comparative Example 4

A positive electrode and a nonaqueous electrolyte secondary battery were fabricated in the same manner as in EXAMPLE 3, except that in the step of preparing an intermediate layer slurry, the alumina particles, the acetylene black and the polyvinylidene fluoride were mixed together in a mass ratio of 89:9:2.

Comparative Example 5

A positive electrode and a nonaqueous electrolyte secondary battery were fabricated in the same manner as in EXAMPLE 1, except that in the step of preparing an intermediate layer slurry, the alumina particles, the acetylene black and the polyvinylidene fluoride were mixed together in a mass ratio of 97:1:2, and in the step of preparing a positive electrode mixture slurry, $LiNi_{0.8}Co_{0.1}Mn_{0.1}O_2$, the acetylene black, the polyvinylidene fluoride and the dilithium hydrogen phosphate were mixed together in a mass ratio of 94:1:1:4.

Comparative Example 6

A positive electrode and a nonaqueous electrolyte secondary battery were fabricated in the same manner as in EXAMPLE 1, except that in the step of preparing an intermediate layer slurry, the alumina particles, the acetylene black and the polyvinylidene fluoride were mixed together in a mass ratio of 97.5:0.5:2.

Comparative Example 7

A positive electrode and a nonaqueous electrolyte secondary battery were fabricated in the same manner as in EXAMPLE 1, except that in the step of preparing a positive electrode mixture slurry, the dilithium hydrogen phosphate was replaced by lithium phosphate.

Comparative Example 8

A positive electrode and a nonaqueous electrolyte secondary battery were fabricated in the same manner as in EXAMPLE 1, except that in the step of preparing a positive electrode mixture slurry, the dilithium hydrogen phosphate was replaced by manganese hydrogen phosphate.

[Nail Penetration Test]

The nonaqueous electrolyte secondary batteries of EXAMPLES and COMPARATIVE EXAMPLES were tested by nail penetration in the following procedures.
(1) In an environment at 25° C., the battery was charged at a constant current of 0.5 C (800 mA) to a battery voltage of 4.2 V, and was thereafter charged at the constant voltage until the current value reached 0.05 C (40 mA).
(2) In an environment at 65° C., the tip of a 3 mmφ thick round nail was placed into contact with a lateral central portion of the battery charged in (1). The round nail was caused to penetrate the battery in the direction of stacking of the electrode assembly at a speed of 80 mm/sec. The operation of the round nail penetration was stopped when the round nail completely pierced the battery.
(3) With a thermocouple attached to the battery surface, the maximum temperature that was reached during the round nail penetration was measured.

[Evaluation of Internal Resistance]

In an environment at 25° C., the nonaqueous electrolyte secondary batteries of EXAMPLES and COMPARATIVE EXAMPLES were charged at a constant current of 0.3 C to a battery voltage of 3.7 V, and were discharged at a constant current of 0.5 C for 10 seconds. The internal resistance of the batteries was determined based on the change in voltage before and after the above discharging, and the discharge current.

Table 1 describes the results of the nail penetration test, and the results of internal resistance of EXAMPLES and COMPARATIVE EXAMPLES.

TABLE 1

| | Phosphate salt | Intermediate layer | Phosphate salt content: X (wt %) | Conductive agent content: Y (wt %) | X/Y | Phosphate salt content (wt %) in lower portion of positive electrode mixture layer | Battery temperature (° C.) during internal short-circuiting | Internal resistance (Ω) |
|---|---|---|---|---|---|---|---|---|
| EX. 1 | Li2HPO4 | Present | 2 | 3 | 0.68 | 47 | 365 | 0.16 |
| EX. 2 | Li2HPO4 | Present | 3 | 1 | 3 | 46 | 360 | 0.20 |
| EX. 3 | Li2HPO4 | Present | 0.5 | 7 | 0.07 | 47 | 371 | 0.11 |
| EX. 4 | LiH2PO4 | Present | 2 | 3 | 0.68 | 47 | 366 | 0.15 |
| EX. 5 | Na2HPO4 | Present | 2 | 3 | 0.68 | 45 | 370 | 0.16 |
| EX. 6 | K2HPO4 | Present | 2 | 3 | 0.68 | 46 | 372 | 0.15 |
| EX. 7 | MgHPO4 | Present | 2 | 3 | 0.68 | 47 | 372 | 0.15 |
| EX. 8 | Li2HPO4 | Present | 2 | 3 | 0.68 | 55 | 360 | 0.16 |
| COMP. EX. 1 | None | Present | — | 3 | — | | 384 | 0.13 |
| COMP. EX. 2 | Li2HPO4 | Absent | 2 | — | — | 47 | 388 | 0.12 |
| COMP. EX. 3 | Li2HPO4 | Present | 0.4 | 7 | 0.06 | 47 | 381 | 0.11 |
| COMP. EX. 4 | Li2HPO4 | Present | 0.5 | 9 | 0.06 | 47 | 383 | 0.10 |
| COMP. EX. 5 | Li2HPO4 | Present | 4 | 1 | 4 | 46 | — | 0.35 |
| COMP. EX. 6 | Li2HPO4 | Present | 2 | 0.5 | 4 | 47 | — | 0.40 |
| COMP. EX. 7 | Li3PO4 | Present | 2 | 3 | 0.68 | 45 | 381 | 0.15 |
| COMP. EX. 8 | MnHPO4 | Present | 2 | 3 | 0.68 | 45 | 380 | 0.15 |

EXAMPLES 1 to 3 resulted in lower battery temperatures during internal short-circuiting than COMPARATIVE EXAMPLES 1 to 4. Thus, it can be said that the batteries attained a reduction in the amount of heat generated during internal short-circuiting by virtue of the use of the positive electrode for nonaqueous electrolyte secondary batteries which included a positive electrode current collector, an intermediate layer disposed on the positive electrode current collector and including a conductive agent and inorganic particles, and a positive electrode mixture layer disposed on the intermediate layer and including a positive electrode active material and a hydrogen phosphate salt represented by the general formula $M_aH_bPO_4$ (wherein a satisfies 1≤a≤2, b satisfies 1≤b≤2, and M includes at least one element selected from alkali metals and alkaline earth metals), and which satisfied 0.5≤X≤3.0, 1.0≤Y≤7.0, and 0.07≤X/Y≤3.0 wherein X is the mass ratio (mass %) of the hydrogen phosphate salt relative to the total mass of the positive electrode active material and Y is the mass ratio (mass %) of the conductive agent relative to the total mass of the intermediate layer.

In COMPARATIVE EXAMPLES 5 and 6, the internal resistance was so high that the charging and discharging reactions could not be performed. This result probably stemmed from the fact that the positive electrodes used in these nonaqueous electrolyte secondary batteries failed to satisfy 0.5≤X≤3.0, 1.0≤Y≤7.0, and 0.07≤X/Y≤3.0.

In COMPARATIVE EXAMPLE 7, the internal short-circuiting generated a large amount of heat probably because the phosphate salt that was used did not contain hydrogen and had such a high thermal decomposition temperature that the phosphate salt did not attain the aforementioned effect of advantageously closing the voids present around the conductive agent. In COMPARATIVE EXAMPLE 8, the internal short-circuiting generated a large amount of heat probably because the phosphate salt that was used did not contain an alkali metal or an alkaline earth metal and was not sufficiently polycondensed after being thermally decomposed, and consequently the phosphate salt did not attain the aforementioned effect of advantageously closing the voids present around the conductive agent.

EXAMPLE 1 attained a lower battery temperature during internal short-circuiting than EXAMPLES 5 to 7 probably because the phosphate salt containing Li had a higher thermal decomposition rate than the salts containing other metals M. EXAMPLE 8 resulted in a low battery temperature during internal short-circuiting as compared to EXAMPLE 1 probably because the content of the hydrogen phosphate salt in the mixture layers near the intermediate layer was increased.

REFERENCE SIGNS LIST

10 NONAQUEOUS ELECTROLYTE SECONDARY BATTERY
11 POSITIVE ELECTRODE
12 NEGATIVE ELECTRODE
13 SEPARATOR
14 ELECTRODE ASSEMBLY
15 BATTERY CASE
16 CASE BODY
17 SEAL BODY
18, 19 INSULATING PLATES
20 POSITIVE ELECTRODE LEAD
21 NEGATIVE ELECTRODE LEAD
22 OVERHANG
23 FILTER
24 LOWER VALVE
25 INSULATING MEMBER
26 UPPER VALVE
27 CAP
28 GASKET
30 POSITIVE ELECTRODE CURRENT COLLECTOR
31 INTERMEDIATE LAYER
32 POSITIVE ELECTRODE MIXTURE LAYER
32a SURFACE ADJACENT TO INTERMEDIATE LAYER

The invention claimed is:

1. A positive electrode for nonaqueous electrolyte secondary batteries comprising:
a positive electrode current collector;
an intermediate layer disposed on the positive electrode current collector and including a conductive agent and inorganic particles; and
a positive electrode mixture layer disposed on the intermediate layer and including a positive electrode active material and a hydrogen phosphate salt represented by the general formula $M_aH_bPO_4$, wherein a satisfies 1≤a≤2, b satisfies 1≤b≤2, and M includes at least one element selected from alkali metals and alkaline earth metals,
the positive electrode satisfying 0.5≤X≤3.0, 1.0≤Y≤7.0, and 0.07≤X/Y≤3.0 wherein X is the mass ratio, in mass %, of the hydrogen phosphate salt relative to the total mass of the positive electrode active material and Y is the mass ratio, in mass %, of the conductive agent relative to the total mass of the intermediate layer,
wherein the content of the hydrogen phosphate salt present in a region extending from a surface of the positive electrode mixture layer adjacent to the intermediate layer to ½ thickness of the positive electrode mixture layer is not less than 55 mass % of the total mass of the hydrogen phosphate salt in the positive electrode mixture layer.

2. The positive electrode for nonaqueous electrolyte secondary batteries according to claim 1, wherein the positive electrode active material comprises a lithium transition metal oxide represented by the general formula $Li_{1+x}Ni_aM_{1-a}O_{2+b}$ (wherein x, a and b satisfy −0.2<x≤0.2, 0.5≤a≤1, and −0.1≤b≤0.1, and M includes at least one element selected from Co, Mn and Al.

3. The positive electrode for nonaqueous electrolyte secondary batteries according to claim 1, wherein the hydrogen phosphate salt comprises at least one of $Li_2HPO_4$ and $LiH_2PO_4$.

4. A nonaqueous electrolyte secondary battery comprising the positive electrode for nonaqueous electrolyte secondary batteries described in claim 1.

* * * * *